United States Patent [19]

Ashton et al.

[11] Patent Number: 5,241,115
[45] Date of Patent: Aug. 31, 1993

[54] CARBONYL DIFLUORIDE PREPARATION

[75] Inventors: David Ashton, Warrington; Thomas A. Ryan, Cheshire, both of England

[73] Assignee: Imperial Chemical Industries PLC, London, England

[21] Appl. No.: 320,890

[22] Filed: Mar. 10, 1989

Related U.S. Application Data

[63] Continuation of Ser. No. 68,138, Jun. 29, 1987, abandoned.

[30] Foreign Application Priority Data

Jul. 1, 1987 [GB] United Kingdom ............... 8616074

[51] Int. Cl.⁵ .............................................. C07C 51/58
[52] U.S. Cl. ..................................... 562/852; 562/851
[58] Field of Search ..................... 260/544 K, 544 F; 562/852, 851

[56] References Cited

U.S. PATENT DOCUMENTS

| | | | |
|---|---|---|---|
| 2,757,214 | 7/1956 | Muetterties | 570/150 |
| 2,836,622 | 5/1958 | Tullock | 260/544 K |
| 3,088,975 | 5/1963 | Fawcett et al. | 562/852 |
| 3,322,823 | 5/1967 | Langer | 562/851 |
| 4,260,561 | 4/1981 | Franz | 562/852 |

FOREIGN PATENT DOCUMENTS 0710843  6/1965  Canada .

*Primary Examiner*—Jose G. Dees
*Assistant Examiner*—Dwayne C. Jones
*Attorney, Agent, or Firm*—Cushman, Darby & Cushman

[57] ABSTRACT

A method for the preparation of carbonyl difluoride which comprises contacting carbonyl chloride fluoride with an active carbon catalyst.

2 Claims, No Drawings

CARBONYL DIFLUORIDE PREPARATION

This is a continuation of application Ser. No. 07/068,138, filed Jun. 29, 1987, abandoned.

This invention relates to a chemical process and more particularly to a method for the preparation of carbonyl difluoride.

Carbonyl difluoride is a known chemical compound and is a potentially useful chemical intermediate. The most convenient methods which have been proposed for the preparation of carbonyl difluoride have involved reacting phosgene with a fluorinating agent. Thus, phosgene may be reacted with hydrogen fluoride to form carbonyl difluoride and hydrogen chloride but the boiling points of the two products are so similar (−83.1 and −84.9° C. respectively) that their separation requires a complicated cryogenic separation. Another method, described in U.S. Patent No.3322823, involves heating a pulverised mixture of calcium fluoride, titanium dioxide and carbon in an electric arc furnace at a temperature of 2800–3500° C. under an argon atmosphere.

It has now been found that carbonyl difluoride can be produced simply and efficiently by the low temperature, carbon catalyzed disproportionation of carbonyl chloride fluoride.

Thus, according to the invention, there is provided a method for the preparation of carbonyl difluoride which comprises contacting carbonyl chloride fluoride with an activated carbon catalyst.

The catalyst may be any material within the broad definition of "an activated carbon". Such materials include the various forms of absorbent or "active" charcoals for example coconut charcoal and the various products formed by activation (for example with sulphuric or phosphoric acid) of various forms of charcoal, for example, bone charcoal. Synthetically produced forms of active carbon may also be used. The catalyst may be used in supported or unsupported forms and in static or moving (e.g. fluidised) reactor beds.

The carbonyl chloride fluoride may be contacted with the active carbon at normal ambient temperatures or at an elevated temperature, for example at a temperature of up to 300° C. The pressure at which the process is carried out is not important and may be at, above or below atmospheric pressure. The time required for the reaction similarly may vary but is usually short. Contact times with the catalyst are usually within the range of 5 to 200 seconds, the longer times being required at the lower temperatures. A diluent such as nitrogen may be used if desired.

The exit gases from the reaction zone wherein the carbonyl chloride fluoride is contacted with the active carbon contain phosgene in addition to the carbonyl fluoride. The two disproportionation products may be separated by fractionation. Since the carbonyl chloride fluoride is conveniently formed by contacting gaseous phosgene with an inorganic fluoride, for example calcium fluoride, at an elevated temperature, the phosgene by-product is advantageously re-cycled for this purpose.

Thus, a continuous process for the manufacture of carbonyl difluoride comprises:

(a) contacting phosgene in the gas phase with an inorganic fluoride (e.g. calcium fluoride) at an elevated temperature (e.g. 200–550° C.) forming a gaseous mixture containing carbonyl chloride fluoride, phosgene, carbon monoxide and chlorine;

(b) contacting the gaseous mixture from step (a) with activated carbon at an elevated temperature (e.g. 200–225° C.) forming a gaseous mixture containing carbonyl chloride fluoride and phosgene;

(c) treating the gaseous mixture from step (b) whereby to separate carbonyl chloride fluoride from phosgene;

(d) further contacting the carbonyl chloride fluoride with activated carbon to form carbonyl difluoride and phosgene;

(e) treating the gaseous mixture from step (d) whereby to separate carbonyl difluoride from phosgene, and (f) returning the phosgene from steps (c) and (e) to step (a).

The disproportionation of carbonyl chloride fluoride which takes place in step (d) does not take place to any appreciable extent in step (b) because of the high concentration of phosgene present. If desired, step (d) may be performed in a distillation column containing active carbon so as to separate carbonyl difluoride from phosgene without the need for step (e).

The invention is illustrated but not limited by the following Example.

EXAMPLE

Mixtures of carbonyl chloride fluoride and nitrogen were passed over a fixed bed of catalyst composed of activated charcoal (15 cm$^3$ Sutcliffe coconut charcoal, grade 208 C). The experimental conditions and results are given in Table 1.

TABLE 1

| Flow Rates (cm$^3$/min) | | Temperature (°C.) | Contact Time (s) | COClF Disproportionated % |
|---|---|---|---|---|
| COClF | N$_2$ | | | |
| 10.3 | 64.5 | 18 | 12.1 | 46.8 |
| 14.5 | 38.2 | 18 | 17.1 | 46.2 |
| 7.2 | 23.8 | 18 | 30.0 | 49.4 |
| 7.2 | 0 | 18 | 125.2 | 68.6 |
| 7.2 | 23.8 | 46.2 | 27.5 | 66.9 |
| 10.3 | 64.5 | 107 | 9.3 | 66.3 |
| 7.2 | 23.8 | 177 | 18.9 | 63.8 |

When the activated carbon catalyst was replaced by silica (15 cm$^3$ Davison grade F-7; 300 m$^2$/g), the results given in Table 2 were obtained showing silica to be a relatively ineffective catalyst for the disproportionation of carbonyl chloride fluoride.

TABLE 2

| Flow Rates (cm$^3$/min) | | Temperature | Contact Time | COClF Disproportionated % |
|---|---|---|---|---|
| COClF | N$_2$ | | | |
| 7.63 | 8.8 | 30 | 52.9 | 0.64 |
| 7.63 | 8.8 | 49 | 49.9 | 0.71 |
| 7.63 | 8.8 | 93 | 43.9 | 0.56 |
| 7.63 | 8.8 | 196 | 34.2 | 1.04 |
| 7.63 | 8.8 | 220 | 32.6 | 1.60 |
| 7.63 | 8.8 | 293 | 28.4 | 5.55 |
| 7.63 | 8.8 | 350 | 25.8 | 10.40 |

I claim:

1. A method for the preparation of carbonyl difluoride which comprises contacting a gas consisting essentially of carbonyl chloride fluoride with an active carbon catalyst at a temperature of up to 300° C.

2. A method according to claim 1 operated as a continuous process comprising:
(a) contacting phosgene in the gas phase with an inorganic fluoride at an elevated temperature forming a gaseous mixture containing carbonyl chloride fluoride, phosgene, carbon monoxide and chlorine;
(b) contacting the gaseous mixture from step (a) with activated carbon at an elevated temperatured forming a gaseous mixture containing carbonyl chloride fluoride and phosgene;
(c) treating the gaseous mixture from step (b) whereby to separate carbonyl chloride fluoride from phosgene;
(d) further contacting the carbonyl chloride fluoride with activated carbon at a temperature of up to 300° C. to form carbonyl difluoride and phosgene;
(e) treating the gaseous mixture from step (d) whereby to separate carbonyl difluoride from phosgene, and
(f) returning the phosgene from steps (c) and (e) to step (a).

* * * * *

UNITED STATES PATENT AND TRADEMARK OFFICE
CERTIFICATE OF CORRECTION

PATENT NO. : 5,241,115

DATED : August 31, 1993

INVENTOR(S) : ASHTON ET AL

It is certified that error appears in the above-identified patent and that said Letters Patent is hereby corrected as shown below:

On the cover page, please correct Item [30] as follows:

"July 1, 1986 [GB]   United Kingdom ...........8616074"

Signed and Sealed this

Twenty-eighth Day of June, 1994

Attest:

BRUCE LEHMAN

*Attesting Officer*      Commissioner of Patents and Trademarks